(12) United States Patent
Koura et al.

(10) Patent No.: US 9,189,985 B2
(45) Date of Patent: Nov. 17, 2015

(54) MOBILE INFORMATION TERMINAL

(75) Inventors: Yuusuke Koura, Takatsuki (JP); Miwa Koshijima, Osaka (JP); Masato Kumagai, Ibaraki (JP)

(73) Assignee: Kyocera Corporation, Kyoto (JP)

( * ) Notice: Subject to any disclaimer, the term of this patent is extended or adjusted under 35 U.S.C. 154(b) by 1699 days.

(21) Appl. No.: 11/908,190

(22) PCT Filed: Feb. 23, 2006

(86) PCT No.: PCT/JP2006/303256
§ 371 (c)(1),
(2), (4) Date: Sep. 10, 2007

(87) PCT Pub. No.: WO2006/095574
PCT Pub. Date: Sep. 14, 2006

(65) Prior Publication Data
US 2009/0023482 A1   Jan. 22, 2009

(30) Foreign Application Priority Data

Mar. 9, 2005  (JP) .................................. 2005-065612
Aug. 30, 2005  (JP) .................................. 2005-249355

(51) Int. Cl.
| | | |
|---|---|---|
| H04W 52/02 | (2009.01) | |
| G09G 3/20 | (2006.01) | |
| H04N 21/414 | (2011.01) | |
| H04N 21/4402 | (2011.01) | |
| H04N 21/443 | (2011.01) | |
| H04N 21/84 | (2011.01) | |
| G09G 3/34 | (2006.01) | |
| H04N 5/57 | (2006.01) | |

(Continued)

(52) U.S. Cl.
CPC ............... *G09G 3/20* (2013.01); *H04N 21/414* (2013.01); *H04N 21/41407* (2013.01);
(Continued)

(58) Field of Classification Search
CPC . G09G 3/20; G09G 3/3406; G09G 2320/062; G09G 2340/0435; H04W 52/027; H04N 21/41407; H04N 21/4436; H04N 21/440281; H04N 21/84; H04N 21/482; H04N 21/414; H04N 5/57; H04N 5/63; H04N 5/60; H04N 7/0127
USPC ............... 455/550.1, 574, 556.1; 379/433.01, 379/433.08; 386/46; 725/133, 141, 153
See application file for complete search history.

(56) References Cited

U.S. PATENT DOCUMENTS 6,047,195 A * 4/2000 Nakanishi .................. 455/552.1
6,909,903 B2 * 6/2005 Wang ......................... 455/456.1
(Continued)

FOREIGN PATENT DOCUMENTS

| JP | 06-120752 | 4/1994 |
|---|---|---|
| JP | 6133238 A | 5/1994 |

(Continued)

OTHER PUBLICATIONS

International Search Report of PCT/JP2006/303256, date of mailing May 30, 2006.
(Continued)

*Primary Examiner* — Raymond Dean
(74) *Attorney, Agent, or Firm* — Duane Morris LLP

(57) ABSTRACT

A mobile information terminal that changes various settings associated with reproduction of a moving image content based on a type of the content so as to reduce power consumption. The mobile information terminal starts a television in response to operation by a user, and receives a moving image content of a selected broadcast program, and EPG data. When a power saving mode is ON, the type of the program is judged according to the EPG data. Subsequently, a default frame rate is changed to a value that has been preset for the program type. Hence, the mobile information terminal reproduces the program at a suitable frame rate. Such a change may be made to settings other than the frame rate.

10 Claims, 7 Drawing Sheets

(51) Int. Cl.
- *H04N 5/60* (2006.01)
- *H04N 5/63* (2006.01)
- *H04N 7/01* (2006.01)
- *H04N 21/482* (2011.01)

(52) U.S. Cl.
CPC .. *H04N 21/4436* (2013.01); *H04N 21/440281* (2013.01); *H04N 21/84* (2013.01); *H04W 52/027* (2013.01); *G09G 3/3406* (2013.01); *G09G 2320/062* (2013.01); *G09G 2320/0626* (2013.01); *G09G 2340/0435* (2013.01); *H04N 5/57* (2013.01); *H04N 5/60* (2013.01); *H04N 5/63* (2013.01); *H04N 7/0127* (2013.01); *H04N 21/482* (2013.01); *Y02B 60/50* (2013.01)

(56) References Cited

U.S. PATENT DOCUMENTS

| | | | |
|---|---|---|---|
| 2002/0172426 A1* | 11/2002 | Honda et al. | 382/235 |
| 2003/0123844 A1* | 7/2003 | Toma et al. | 386/46 |
| 2004/0031063 A1* | 2/2004 | Satoda | 725/143 |
| 2005/0270265 A1* | 12/2005 | Plut | 345/102 |

FOREIGN PATENT DOCUMENTS

| | | |
|---|---|---|
| JP | 5-3289 | 9/1994 |
| JP | 7-15681 | 1/1995 |
| JP | 10-191274 | 7/1998 |
| JP | 10-209779 | 8/1998 |
| JP | 10322622 A | 12/1998 |
| JP | 2000134557 A | 5/2000 |
| JP | 2002-335457 | 11/2002 |
| JP | 2003204493 A | 7/2003 |
| JP | 2002271671 A | 9/2003 |
| JP | 2003264767 A | 9/2003 |
| JP | 2005184519 A | 7/2005 |
| JP | 2005210707 A | 8/2005 |

OTHER PUBLICATIONS

Office Action from Japanese Patent Application No. 2005-249355, mailed on Jun. 29, 2010, 16 pages.

Office Action from Japanese Patent Application No. 2005-249355, mailed on Sep. 28, 2010.

Office Action from Japanese Patent Application No. 2005-249355, mailed on Jun. 7, 2011.

* cited by examiner

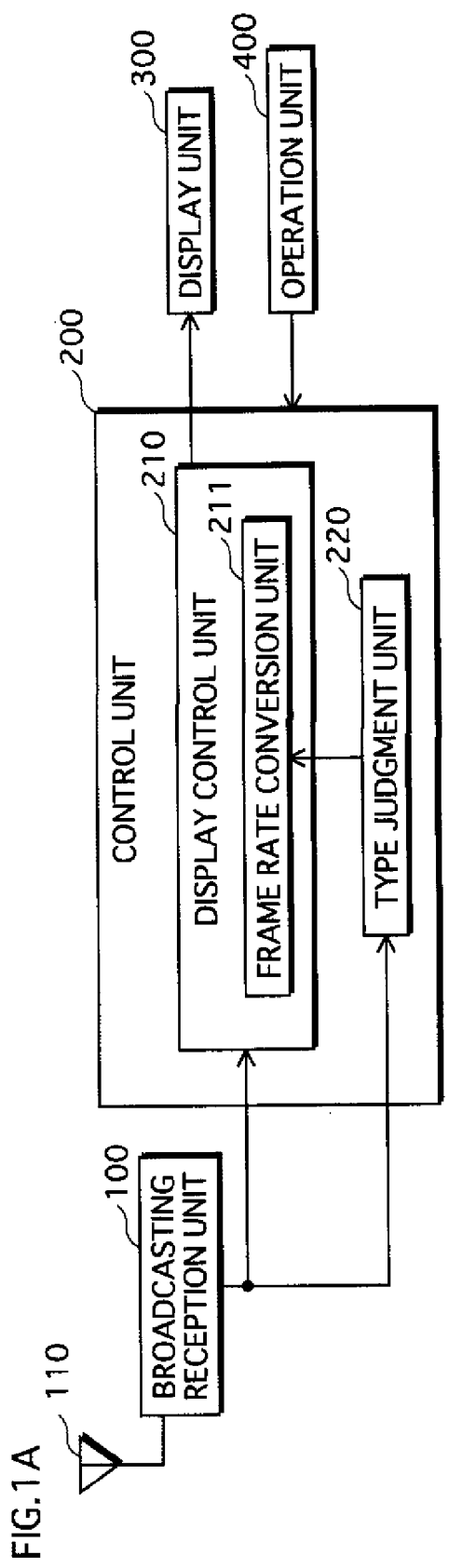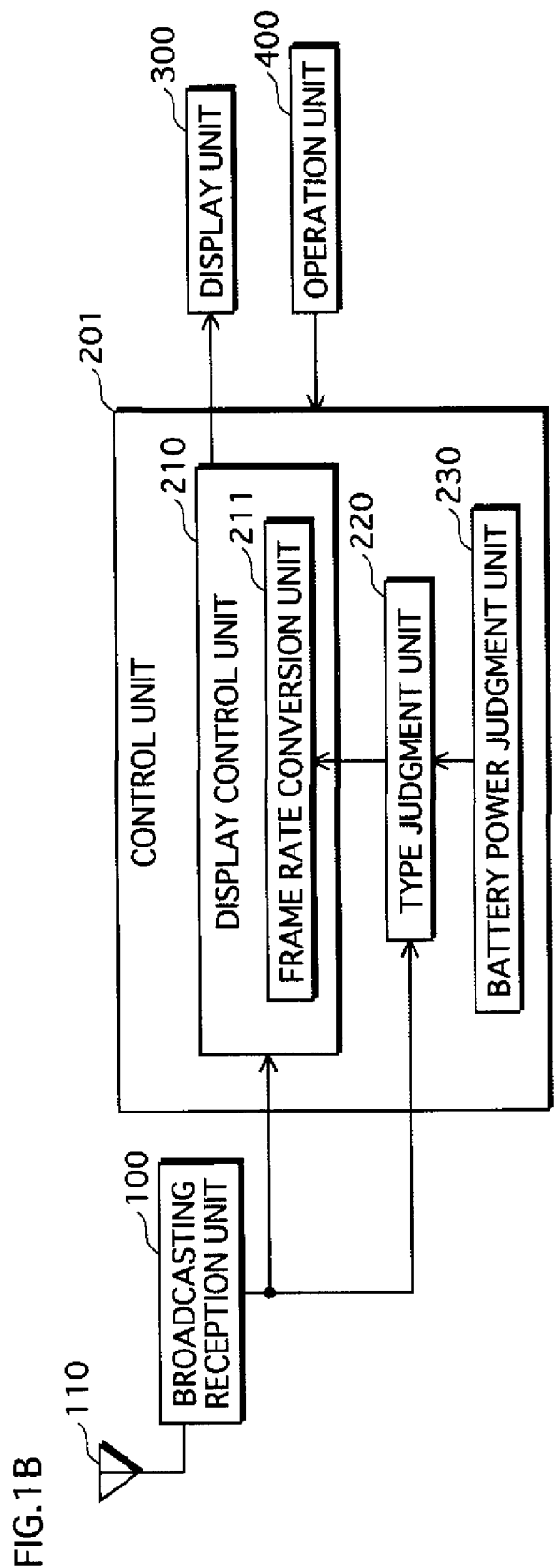
FIG.1A
FIG.1B

FIG.2A

| FUNCTION | STATUS |
|---|---|
| POWER SAVING MODE | ON |
| . . . | . . . |

FIG.2B

| TYPE | FRAME RATE |
|---|---|
| MOVIE | 30fps |
| DRAMA | 30fps |
| SPORT | 30fps |
| NEWS | 15fps |
| WEATHER | 15fps |

FIG.2C

| TYPE | LUMINANCE LEVEL |
|---|---|
| MOVIE | 4 |
| DRAMA | 4 |
| SPORT | 4 |
| NEWS | 3 |
| WEATHER | 3 |

FIG.2D

| TYPE | SOUND LEVEL |
|---|---|
| MOVIE | 3 |
| DRAMA | 3 |
| SPORT | 3 |
| NEWS | 3 |
| WEATHER | 1 |

FIG.2E

| FRAME RATE | LUMINANCE LEVEL | SOUND LEVEL |
|---|---|---|
| 30fps | 5 | 5 |

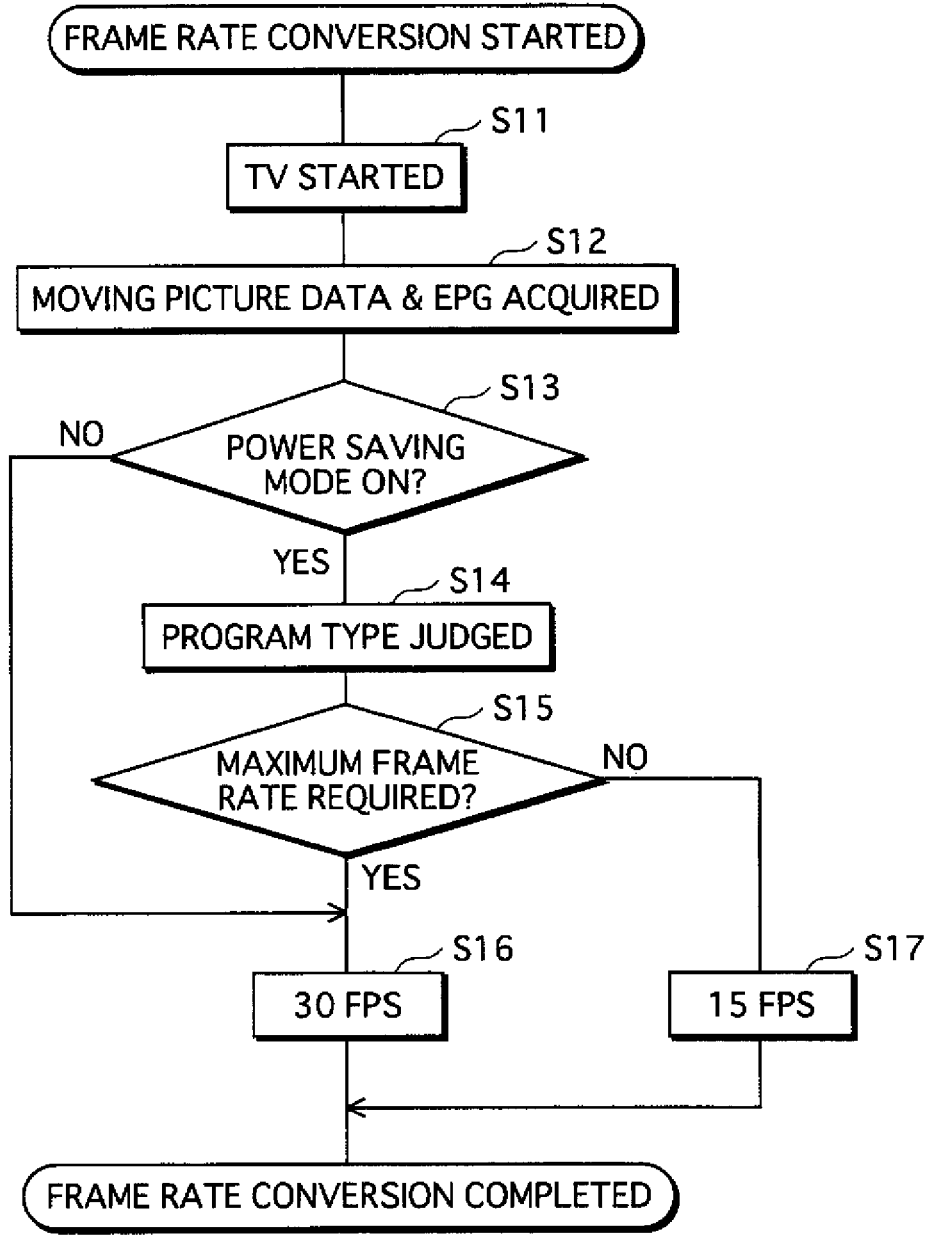

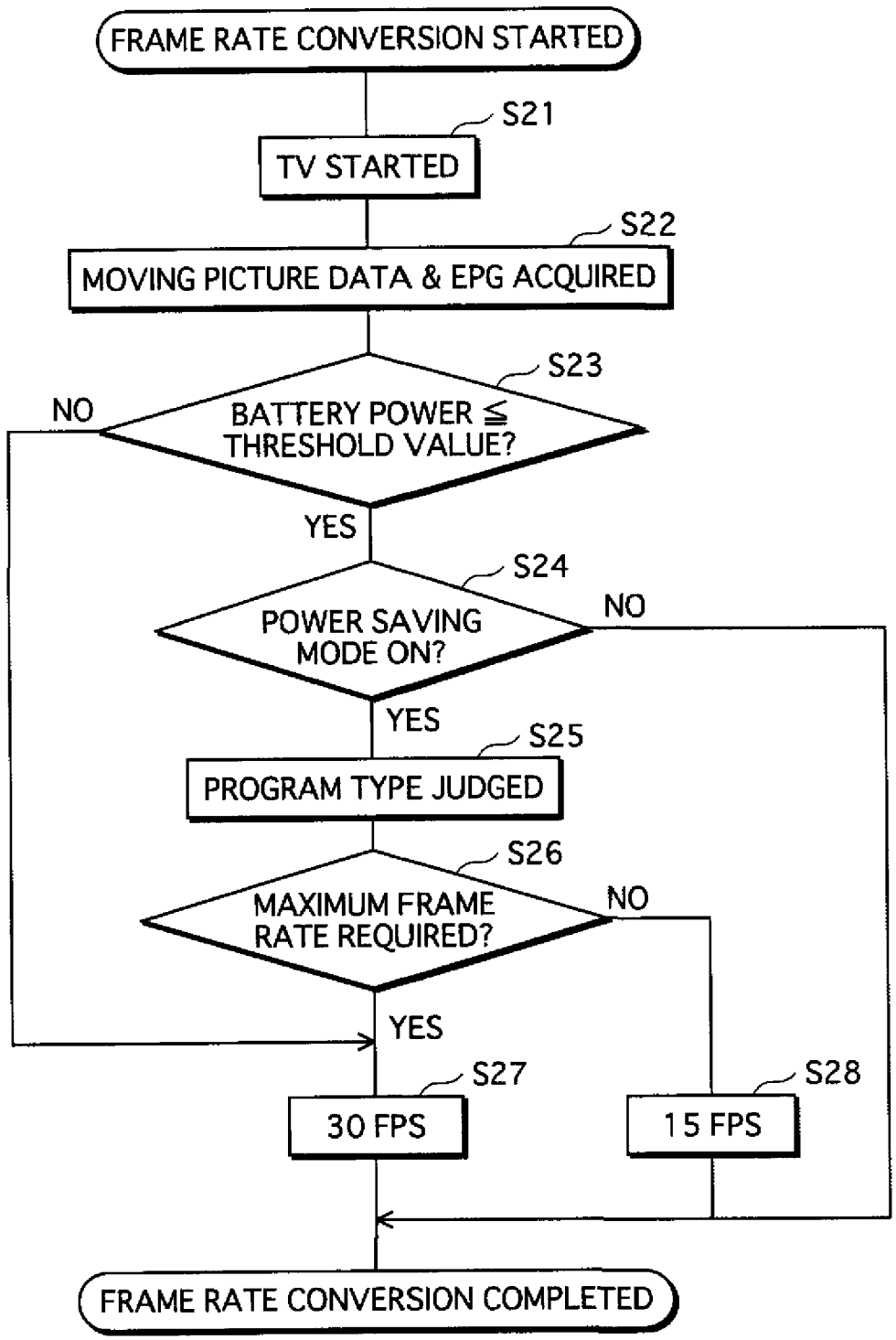

MOBILE INFORMATION TERMINAL

TECHNICAL FIELD

The present invention generally relates to a mobile information terminal, and more particularly to a mobile information terminal that reproduces moving image contents.

BACKGROUND ART

Recently, mobile information terminals such as mobile phones that are equipped with a broadcast receiving function have been prevalent. Such a mobile information terminal enables a received television program to be reproduced by displaying moving images of the program on a screen and by outputting sound of the program to a speaker.

To reproduce a television program on a mobile phone, electricity is supplied from a battery provided inside the mobile phone. When a frame rate, a speed of frames produced per second to display moving images, of the program is high, the program of clearer pictures and smoother motion is displayed on a screen of the mobile phone. However, the higher the frame rate is, the larger a data volume that is processed per second is, which requires a larger amount of power consumption of the mobile phone.

An image quality of a conventional mobile phone and the like is predetermined; moving images are displayed at one fixed frame rate. In view of lowering power consumption rather than improving the image quality, Patent Document 1 discloses a mobile terminal device whose frame rate at which pictures are displayed is selectable by a user.
PATENT DOCUMENT 1: Japanese Patent Application Publication No. 2002-271671

DISCLOSURE OF THE INVENTION

Problems the Invention is Attempting to Solve

The mobile terminal device disclosed in Patent Document 1 is able to lower power consumption and thus extend viewing time through the frame rate adjustment by the user.

However, a user needs to make a judgment whether to alter a frame rate to display moving images, which is troublesome operation for the user.

The present invention is made in view of the above problems. It is an object of the present invention to provide a mobile information terminal that modifies various settings associated with reproduction such as a frame rate so as to reduce power consumption without troubling a user.

Means for Solving the Problems

In order to solve the aforementioned problems, the present invention provides a mobile information terminal that reproduces a moving image content including a type judgment unit operable to judge a type of the moving image content, and a reproduction unit operable to select, according to the type judged by the type judgment unit, one reproducing mode out of a plurality of reproducing modes each associated with reproduction that results in a different level of power consumption, and to reproduce the moving image content in the selected reproducing mode.

Technical Advantages of the Invention

With the above configuration, the mobile information terminal of the present invention enables a moving image content to be reproduced in a reproducing mode that is in accordance with a type of the moving image content. For example, a user makes different display settings in advance for different types of programs according to user's preferences in order that less power may be consumed for reproducing a program with the user's preset operation than would otherwise be consumed. As a result, the power consumption can be reduced without bothering the user to adjust the settings while the user is viewing.

Furthermore, the present invention provides the mobile information terminal, wherein the reproduction unit includes a display unit operable to display the moving image content, and the plurality of reproducing modes relate to a plurality of different frame rates for displaying the moving image content on the display unit.

With the above configuration, the present invention enables the reproduction unit to convert a frame rate for displaying a moving image content according to a type of the content judged by the type judgment unit. Therefore, a user does not need to adjust the frame rate to reduce battery power consumption every time when executing reproduction of a moving image content. For example, for a moving image content with little motion and a low image quality priority, settings may be made to select a low frame rate. As a result, a user is saved a step of adjusting the frame rate, and yet power consumption of the mobile information terminal is reduced.

When the reproducing modes relate to frame rates, reproducing a moving image content in the selected reproducing mode means that the frame rate, a number of frames to be displayed per second, of the moving image content is altered to a value that corresponds to the type of the content Thus, the content is reproduced at the altered frame rate.

Furthermore, the present invention provides the mobile information terminal, wherein the reproduction unit includes a backlight, and the plurality of reproducing modes relate to a plurality of different luminance levels of the backlight for displaying the moving image content.

With the above configuration, the present invention enables the reproduction unit to modify the luminance level of the backlight according to the moving image content type judged by the type judgment unit. Thus, for a moving image content that does not require a high image quality, a low luminance level is set so that power consumption of the backlight is reduced without troubling a user to control luminance while the user is viewing the content.

Furthermore, the present invention provides the mobile information terminal, wherein the reproduction unit further includes a sound output unit operable to output sound of the moving image content, the plurality of reproducing modes relate to a plurality of different sound levels for outputting the sound of the moving image content, and according to the type judged by the type judgment unit, the reproduction unit selects a frame rate out of the plurality of frame rates and a sound level out of the plurality of sound levels, and reproduces the moving image content at the selected frame rate and sound level.

Furthermore, the present invention provides the mobile information terminal, wherein the reproduction unit further includes a sound output unit operable to output sound of the moving image content, the plurality of reproducing modes relate to a plurality of different sound levels for outputting the sound of the moving image content, and according to the type judged by the type judgment unit, the reproduction unit selects one luminance level out of the plurality of luminance levels and one sound level out of the plurality of sound levels, and reproduces the moving image content at the selected luminance level and sound level.

With the above configuration, the present invention enables the reproduction unit to modify the sound level of a moving image content according to a type of the content, as in the case of modification of the frame rate and/or the backlight luminance level. For example, a low sound level is suitable for displaying a moving image content such as a weather report that a user may comprehend more easily through moving images than sound. The preset low sound level ensures reduction of power consumption on playback without bothering the user to control the sound level every time to view the content.

Furthermore, the present invention provides the mobile information terminal, wherein the moving image content is a broadcast program composed of digital broadcasting data, and the type judgment unit judges a type of the broadcast program according to an acquired electronic program guide.

With the above configuration, the present invention enables a type of the program to be judged based on an acquired electronic program guide when the electronic program guide shows the program type, since the mobile information terminal acquires digital broadcasting program data and an electronic program guide. Accordingly, for example, a frame rate of a program with less image quality priority such as a news program may be preset lower than that with a higher image quality priority such as a TV drama. The program with a lower image quality priority is automatically displayed at the preset low frame rate without troubling a user to be mindful of a program type, and thus power consumption is reduced.

Furthermore, the present invention provides the mobile information terminal, wherein the moving image content includes one of stereo sound data and monaural sound data, a type of a broadcast program composed of the moving image content is determined depending on which one of the stereo sound data and the monaural sound data is included, and the type judgment unit judges the type of the broadcast program by distinguishing the stereo sound data from the monaural sound data.

With the above configuration, the present invention enables the type judgment unit to distinguish stereo sound data from monaural sound data of a moving image content. For instance, images of commercial messages, most of which are composed of monaural sound data, may be displayed at a lower frame rate than regular programs mostly composed of stereo sound data. The abovementioned method is effective on the assumption that general users would regard an image quality of commercial messages as less important than regular programs.

Furthermore, the present invention provides the mobile information terminal further including a battery, and a battery power judgment unit operable to judge whether a battery level is equal to a threshold value or below, and wherein only if the battery power judgment unit judges that the battery level is equal to the threshold value or below, the reproduction unit selects one reproducing mode out of the plurality of reproducing modes according to the type judged by the type judgment unit, and reproduces the moving image content in the selected reproducing mode.

With the above configuration, the present invention enables the battery power judgment unit to judge whether the battery level of the mobile information terminal is equal to the threshold vale or smaller. Thus, only when the battery level is equal to the threshold value or smaller, the reproducing mode is modified depending on a type of the moving image content. In a case that the reproducing mode relates to a frame rate, for example, when using the mobile information terminal whose default frame rate is set high, a user can view high-quality images until the battery level gets equal to the threshold value or smaller.

BRIEF DESCRIPTION OF THE DRAWINGS

FIG. 1A is a functional block diagram of a mobile phone 10 in accordance with Embodiment 1 of the present invention;

FIG. 1B is a functional block diagram of the mobile phone 10 in accordance with Embodiment 2 of the present invention;

FIG. 2A shows the configurations and exemplary data contents of a function setting table of the mobile phone 10 in accordance with embodiments of the present invention;

FIG. 2B shows the configurations and exemplary data contents of a frame rate table of the mobile phone 10 in accordance with Embodiments 1 and 2 of the present invention;

FIG. 2C shows the configurations and exemplary data contents of a luminance level table of the mobile phone 10 in accordance with Embodiment 3 of the present invention;

FIG. 2D shows the configurations and exemplary data contents of a sound level table of the mobile phone 10 in accordance with Embodiment 3 of the present invention, FIG. 2E shows the configuration and the exemplary data contents of setting information of the mobile phone 10 in accordance with Embodiment 3 of the present invention;

FIG. 3 is a flow chart showing an operation flow of frame rate conversion by the mobile phone 10 in accordance with Embodiment 1 of the present invention;

FIG. 4 is a flow chart showing an operation flow of frame rate conversion by the mobile phone 10 in accordance with Embodiment 2 of the present invention;

Figure 5:
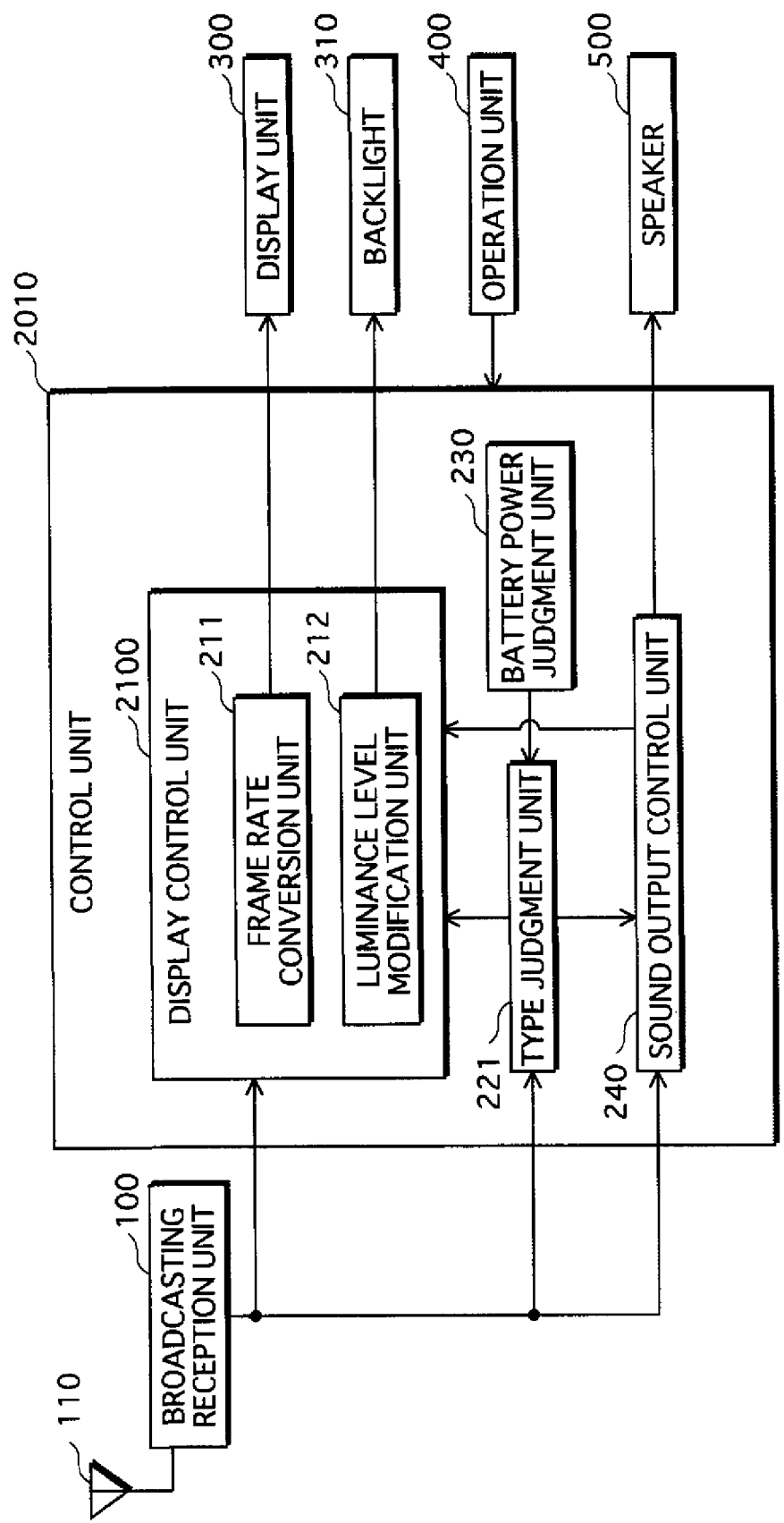
FIG. 5 is a functional block diagram of the mobile phone 10 in accordance with Embodiment 3 of the present invention.

REFERENCE NUMERALS 10 mobile phone
11 display screen
12 manual operation button unit
100 broadcasting reception unit
110 antenna
200, 201 control unit
210, 2100 display control unit
211 frame rate conversion unit
212 luminance level modification unit
220 type judgment unit
230 battery power judgment unit
240 sound output control unit
300 display unit
310 backlight
400 operation unit
500 speaker

DESCRIPTION OF THE PREFERRED EMBODIMENT

Embodiment 1

Following is a description of a mobile phone in accordance with Embodiment 1 of the present invention.

Figure 7:
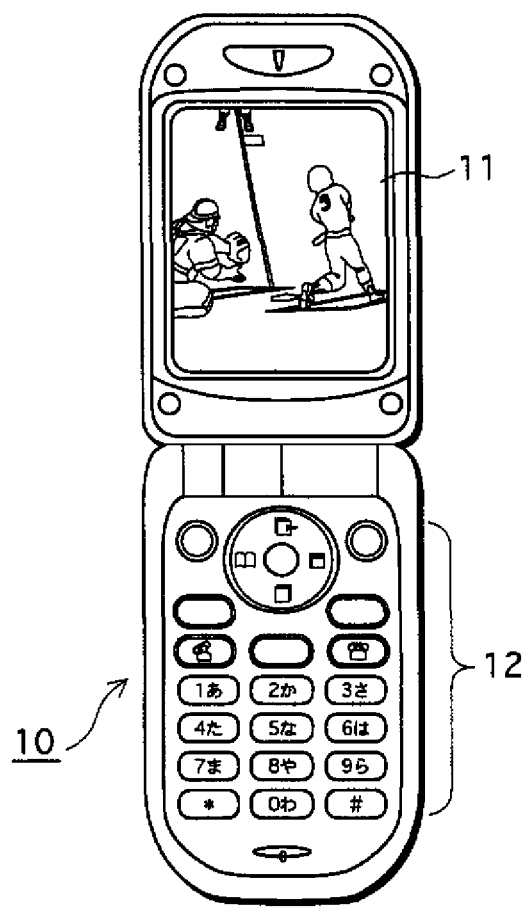
FIG. 7 is an external view of the mobile phone 10 in accordance with Embodiments 1, 2 and 3 of the present invention.

FIG. 7 is an external view of the mobile phone in accordance with embodiments of the present invention.

As shown in FIG. 7, the mobile phone 10 includes a display screen 11, and a manual operation button unit 12 such as a numeric key pad. The mobile phone 10 further includes a battery, a tuner for receiving digital broadcasting, and an antenna all of which are embedded therein. To display moving images of a received digital broadcasting program on the display screen 11, the mobile phone 10 converts a frame rate according to a type of the program. Accordingly the images of the program are presented on the display screen 11 at the converted frame rate.

<Configuration>

FIG. 1A is a functional block diagram of the mobile phone 10 in accordance with Embodiment 1 of the present invention.

The mobile phone 10 includes an antenna 110, a broadcasting reception unit 100, a control unit 200, a display unit 300, and an operation unit 400.

The antenna 110 receives broadcasting signals from television stations in response to operation by a user.

The broadcasting reception unit 100 receives digital broadcasting signals via the antenna 110. From the digital broadcasting signals, the broadcasting reception unit 100 extracts broadcasting data on a channel selected by the user, and then demodulates the data and conducts error correction on the demodulated data. The broadcasting reception unit 100 classifies the demodulated data into MPEG-2 moving image data and sound data. The digital broadcasting signals include moving image data and electronic program guide (EPG) data.

The control unit 200, which is realized by a processor or memory (ROM and RAM), controls each unit of the mobile phone 10. The control unit 200 includes a display control unit 210, and a type judgment unit 220.

The display control unit 210 includes a frame rate conversion unit 211. The display control unit 210 decodes the MPEG-2 moving image data and outputs the decoded data to the display unit 300 at a frame rate stored in memory. A frame rate means a number of frames displayed per second; 30 fps indicates 30 frames outputted per second.

For example, to display moving image data whose original frame rate is 30 fps at a frame rate of 15 fps, the display control unit 210 selects one out of every two successive frames of 30 frames, and sequentially outputs the selected frames of the moving image data to the display unit 300.

The frame rate conversion unit 211 converts data of a frame rate in memory based on a judgment result of the type judgment unit 220 and on a frame rate table that is described later in this embodiment.

The type judgment unit 220 judges the program type of the moving image data according to the EPG data received by the broadcasting reception unit 100.

The display unit 300, which is realized by a liquid crystal display and the like, displays images of the moving image data in response to a control signal from the display control unit 210.

The operation unit 400 transmits a signal that corresponds to the user operation of a button in the manual operation button unit 12.

<Data>

FIG. 2 are tables showing table data stored in memory of the mobile phone 10 in accordance with embodiments of the present invention.

FIG. 2A shows the configurations and exemplary data contents of a function setting table 20 of the mobile phone 10.

The function setting table 20 associates a function 21 with a status 22. The function 21 shows executable functions of the mobile phone 10. The status 22, which has been set by a user in advance, shows whether to execute each of the functions.

When the function table 20 shows that a saving mode is ON, a frame rate is converted on displaying a moving image.

FIG. 2B shows configurations and exemplary data contents of a frame rate table 30 of the mobile phone 10.

As shown in FIG. 2B, the frame rate table 30 associates a type 31 with a frame rate 32, and is prestored in memory. A frame rate is set for each type of programs received at the mobile phone 10.

Note that the frame rate in this embodiment is set as follows. For a type of a program with little motion and a low image quality priority such as a news program, a low frame rate is set. For another type of a program with a high image quality priority such as a TV drama, the maximum frame rate of the mobile phone 10 is set.

When the power saving mode is ON in the function setting table 20, the frame rate table 30 is read by the frame rate conversion unit 211.

<Operation>

Following is a description of operation of the mobile phone 10 in accordance with Embodiment 1 of the present invention.

FIG. 3 is a flow chart showing an operation flow of frame rate conversion by the mobile phone 10.

Note that, in this embodiment, the maximum frame rate of the mobile phone 10 is 30 fps, which is explained as a default frame rate.

As shown in FIG. 3, the control unit 200 starts a television, responding to operation of the manual operation button unit 12 by a user (Step S11). The broadcasting reception unit 100 receives, via the antenna 110, broadcasting signals from a selected television station.

Subsequently, the broadcasting reception unit 100 acquires moving image data and EPG data by demodulating the broadcasting signals. The broadcasting reception unit 100 transmits the moving image data to the display control unit 210, and the EPG data to the type judgment unit 220 (Step S12).

The type judgment unit 220, which receives the EPG data in Step S12, reads the function setting table 20 from memory to judge whether the power saving mode is ON (Step S13).

In Step S13, when the type judgment unit 220 judges that the power saving mode is ON (Step S13:Y), the type judgment unit 220 judges a program type of the moving image data based on the EPG data, and transmits the judgment result to the frame rate conversion unit 211 (Step S14).

In Step S15, when the frame rate conversion unit 211 judges, based on the judgment result and the frame rate table 30, that the program type shown in the judgment result requires display at the maximum frame rate (Step S15:Y), the frame rate conversion unit 211 converts the frame rate stored in memory to 30 fps (Step S16). Subsequently, referring to the frame rate in memory, the display control unit 210 outputs the demodulated moving image data to the display unit 300 at 30 fps.

In Step S13, when the type judgment unit 220 judges that the power saving mode is not ON, the type judgment unit 220 transmits a signal indicating the judgment result to the frame rate conversion unit 211. The frame rate conversion unit 211 performs Step S16.

In Step S15, when the frame rate conversion unit 211 judges that the type of the program does not require display at the maximum frame rate (Step S15:N), the frame rate conversion unit 211 converts the frame rate in memory to 15 fps (Step S17). Subsequently, referring to the frame rate in memory, the display control unit 210 outputs the demodulated moving image data to the display unit 300 at 15 fps.

<Example of Operation>

Following is a description based on the above operation flow of the mobile phone 10 in accordance with Embodiment 1 of the present invention.

Note that, in this description, the frame rate of the mobile phone 10 is set to 30 fps, and a user selects a news program of a certain television station.

The broadcasting reception unit 100 receives broadcasting signals in response to user operation of the manual operation button unit 12 (Step S11). The broadcasting reception unit 100 extracts broadcasting data that corresponds to a news program transmitted on a selected channel from the signals, and demodulates the data, thereby acquiring moving image data and EPG data. The broadcasting reception unit 100 then transmits these acquired data to the display control unit 210 and the type judgment unit 220 (Step S12).

Subsequently, the type judgment unit 220 reads the function setting table 20. Judging the power saving mode is ON, the type judgment unit 220 judges that a program type is a news program based on the EPG data. The type judgment unit 220 transmits the judgment result showing the type to the frame rate Conversion unit 221 (Step S13:Y, Step S14).

Upon receiving the judgment result, the frame rate conversion unit 221 reads the frame rate table 30 from memory, and converts the frame rate stored in memory from 30 fps to 15 fps (Step S17). The display control unit 210 outputs the moving image data of the news program to the display unit 300 at 15 fps.

Embodiment 2

In Embodiment 1, the frame rate is converted according to the status of the power saving mode in the function setting table 20 of the mobile phone 10. In Embodiment 2 of the present invention, however, a frame rate is converted according to a battery level of the mobile phone 10.
<Configuration>

Following is a description of a mobile phone in accordance with Embodiment 2.

FIG. 1B is a functional block diagram of the mobile phone in accordance with Embodiment 2 of the present invention. Functional units in Embodiment 2 that are different from those in Embodiment 1 are described as follows.

Note that the mobile phone used in Embodiment 2 is basically identical with the mobile phone 10 in Embodiment 1. The functional units in Embodiment 2 which are identical with those in Embodiment 1 bear the identical reference numerals with Embodiment 1.

A battery power judgment unit 230 detects a battery level in the mobile phone 10, and judges whether the battery level is equal to a predetermined threshold value or smaller. The threshold value of the battery level is stored in memory such as ROM. For instance, 50% of the maximum battery power is set as the threshold value.

When receiving a signal showing the battery level is equal to the threshold value or smaller from the battery power judgment unit 230, the type judgment unit 220 judges a type of a program composed of received moving image data according to EPG data.
<Operation>

Following is a description of operation of the mobile phone 10 in accordance with Embodiment 2.

FIG. 4 is a flow chart showing an operation flow of frame rate conversion by the mobile phone 10 in accordance with Embodiment 2.

Similarly to Embodiment 1, the broadcasting reception unit 100 starts a television according to a user's selection of a television station, and thereby receiving broadcasting signals (Step S21), and acquires moving image data and EPG data (Step S22).

The battery power judgment unit 230 detects the battery level, reads the threshold value in memory such as ROM, and judges whether the battery level is equal to the threshold value or smaller (Step S23).

When the battery power judgment unit 230 judges the battery level is equal to the threshold value or smaller (Step S23:Y), and that the power saving mode is ON(Step S24:Y), the battery power judgment unit 230 transmits a signal showing the judgment result to the type judgment unit 220. As in the case of Embodiment 1, the type judgment unit 220 judges the program type according to the EPG data (Step S25).

When the battery power judgment unit 230 judges that the battery level is larger than the threshold value (Step S23:N), the display control unit 210 outputs the moving image data to the display unit 300 at the default frame rate of 30 fps.

A description of processing after Step S25 is omitted, as the processing is identical with that of Embodiment 1.

Embodiment 3

Embodiments 1 and 2 are descriptions of frame rate change according to a program type. However, the change is not limited to a frame rate. A luminance level of a backlight or a sound level of a speaker may be changed according to a program type.

Following is a description of such a change in the luminance level or sound level.

A mobile information terminal in accordance with Embodiment 3 of the present invention is basically identical with the abovementioned mobile phone 10. Only functional units that differ from those in Embodiments 1 and 2 are described below.
<Configuration>

FIG. 5 is a functional block diagram of the mobile phone 10 in accordance with Embodiment 3.

In addition to the identical functional units with those in Embodiment 2, the mobile phone 10 has following features. The mobile phone 10 includes a backlight 310, and a speaker 500. A control unit 2010 includes a sound output control unit 240, and a display control unit 2100 includes a luminance level modification unit 212.

The backlight 310 irradiates the display unit 300 that is realized by a liquid crystal display in response to an instruction from the luminance level modification unit 212 that is expounded later in this embodiment.

The speaker 500 outputs sound received by the broadcasting reception unit 100 at a sound level determined by the sound output control unit 240 that is described later.

The luminance level modification unit 212 modifies a luminance level that has been preset for a program type judged by the type judgment unit 221. Accordingly, the backlight 310 irradiates the display unit 300 at the luminance level.

The sound output control unit 240 converts digital sound data received at the broadcasting reception unit 100 to an analogue signal, and outputs the analogue signal to the speaker 500 at a sound level predetermined for the program type judged by the type judgment unit 221.
<Data>

In addition to the tables shown in Embodiments 1 and 2, a table stored in memory of the mobile phone 10 in accordance with Embodiment 3 is described as follows.

FIG. 2C shows the configurations and exemplary data contents of a luminance level table 40 of the mobile phone 10.

The luminance level table 40 stores data associating a type 41 with a luminance level 42. Similarly to Embodiments 1 and 2, the type 41 shows types of programs. The luminance level 42 shows luminance levels of the backlight 310 set for each program type.

In Embodiment 3, a luminance level may be set to any level from Levels 5 to 1. The higher the level is, the higher luminance is. For a news program or a weather report, in Embodiment 3, the luminance level is set lower than that of a movie or a TV drama.

Note that both the frame rate table 30 and the luminance level table 40 are hereinafter collectively called a "display information table" for convenience.

FIG. 2D shows the configurations and exemplary data contents of a sound level table 50 of the mobile phone 10 in accordance with Embodiment 3.

The sound level table 50 stores data associating a type 51 with a sound level 52. Similarly to Embodiments 1 and 2, the type 51 shows types of programs. The sound level 52 shows sound levels of sound data outputted to the speaker 500.

In Embodiment 3, a sound level may be set to any level from Levels 5 to 11 from the maximum to minimum.

FIG. 2E shows the configuration and the exemplary data content of setting information table 60 of the mobile phone 10 in accordance with Embodiment 3.

The setting information table 60 stores data associating a frame rate 61, a luminance level 62, and a sound level 63 with one another.

The frame rate 61 shows a current frame rate. The luminance level 62 shows a current luminance level of the backlight. The sound level 63 shows a current sound level of the speaker 500.

All of the frame rate, the luminance level and the sound level are set to the maximum values. Each of the values may be changed for the following reasons: a user changes one or more of the values; or the display control unit 2100 and the sound output control unit 240 change the respective values when a battery level is equal to a threshold value or smaller.

<Operation Example>

Figure 6:
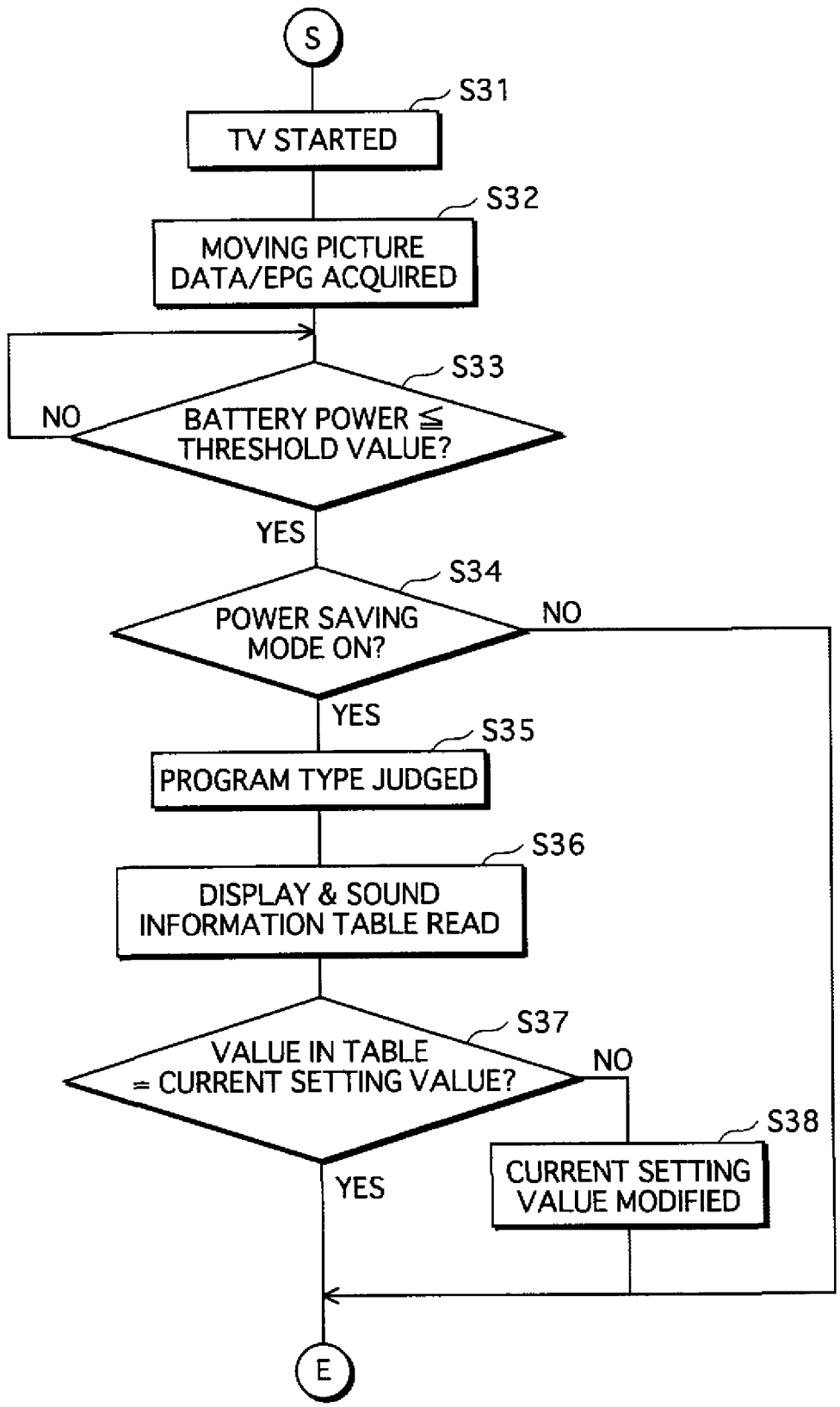
FIG. 6 is a flow chart showing an operation flow of setting-information modification by the mobile phone 10 in accordance with Embodiment 3 of the present invention.

FIG. 6 is a flow chart showing an operation flow in accordance with Embodiment 3. Following is a description of an operation example with reference to FIG. 6.

In Embodiment 3, values of the setting information table 60 are preset as shown in FIG. 2E. The mobile phone 10 receives a program of a weather report in response to operation by a user. When the battery level is equal to a threshold value or smaller, the frame rate, the luminance level, and the sound level in the setting information table 60 are changed to values set for the program type. Following describes a different processing from that in Embodiments 1 or 2.

When the battery power judgment unit 230 judges the battery level is equal to the threshold value or smaller in Step S33, and that the power saving mode is ON in Step S34 (Step S33:Y, and Step S34:Y), the battery power judgment unit 230 transmits information showing the judgment result to the type judgment unit 220 and the sound output control unit 240.

In Step S35, the type judgment unit 220 judges that the program type is a weather report, and transmits the judgment result to the display control unit 2100 and the sound output control unit 240.

In Step S36, the display control unit 2100 reads the display information table from memory. The sound output control unit 240 reads the sound level table 50 from memory.

In Step S37, based on the display information table, the frame rate conversion unit 211 and the luminance level modification unit 212 judge that the values of the frame rate and the luminance level in the setting information table 60 are not identical with the ones set for the weather report. The sound output control unit 240 judges, based on the sound level table 50, that the value of the sound level in the setting information table 60 is not identical with the one set for the weather report (Step S37:Y).

In Step S38, the frame rate conversion unit 211 converts the frame rate from 30 fps to 15 fps. The luminance level modification unit 212 modifies the luminance level from Level 5 to 2.

The sound output control unit 240 converts the digital sound data passed from the broadcasting reception unit 100 to an analogue signal, and changes the sound level from Level 5 to 1.

<Supplementary Explanation>

Hereinbefore, the mobile information terminal in accordance with Embodiments 1 and 2 of the present invention is described. However, the present invention is never limited to the mobile phone shown in the abovementioned embodiments, and may also be applied in embodiments shown as below.

(1) Embodiments 1, 2, and 3 describe cases in which the frame rate, the luminance level and/or the sound level are modified according to the type of the digital broadcasting program received at the mobile phone 10. However, the modification may also be made according to a judgment result of whether a broadcast content is a commercial message.

Following is an example of a case in which the mobile phone 10 receives an analog broadcasting program.

The type judgment unit 220 judges whether a type of a sound signal received from a user-selected station is stereo or monaural, and determines that a section of a broadcast content corresponding to the stereo signal is a commercial message. The type judgment unit 220 transmits a signal that indicates whether the sound signal type corresponding to moving images of the broadcast content is stereo or monaural to the frame rate conversion unit 211.

A table showing a frame rate, a luminance level, and a sound level set for each of the stereo and monaural signals is stored in memory and such.

Upon receiving the signal indicating the sound type, the frame rate conversion unit 211, the luminance level modification unit 212, and the sound output control unit 240 read the table to specify the frame rate, the luminance level, and the sound level that are in accordance with the sound signal type. As a result, the frame rate, the luminance level, and the sound level are changed to the specified values in memory.

Note that the judgment as to whether a moving image content of digital broadcasting data is a commercial message may be made based on sound information that indicates whether the sound signal is stereo or monaural. The sound information is described by a component descriptor included in an Event Information Table (EIT) of EPG data.

(2) In Embodiments 1 and 2, the descriptions are made with use of the mobile phone. However, a mobile information terminal such as a Personal Digital Assistance (PDA) that receives television broadcast may replace the mobile phone.

(3) The embodiments describes a case in which the frame rate is set at either of two levels of 30 fps and 15 fps, and each of the luminance level and the sound level is set at one of five levels. However, the number of the levels of the frame rate, the luminance level, and the sound level are not limited to those described in the embodiments. As long as setting levels may be altered, the setting may have any number of levels.

(4) A program that enables a processor of a mobile phone to execute frame rate conversion may be circulated and distributed with a recording medium the program recorded thereon or via a telecommunication line and such. Examples of such a recording medium include an IC card, a hard disk, an optical disc, a flexible disc, a ROM and the like. The circulated and distributed program is made available by storing the program in memory that can be read with the processor. It is when the process or executes the program that the functions of the mobile phone shown in the embodiments are realized.

(5) In Embodiments 1 and 2, the type of the program is judged according to the EPG data. However, when broadcasting data of a program is attached with information indicating the program requires a high image quality such as a movie or a TV drama, a type of the program may be judged according to the attached information. For example, a program with no such information may be displayed at a lowered frame rate.

(6) Embodiment 3 describes the following case; it is when the battery level is equal to the threshold value or smaller that current setting values of the frame rate, the luminance level, and the sound level may be modified to the values that have been preset for the program type. However, it is applicable to modify setting values in multiple steps. For example when the luminance level changes from Level 5 to 3, a step-by-step change may be made such as from Level 5 to 4 to 3. Such a change enables a television program to be reproduced without causing user discomfort such as a sudden decrease in luminance of the backlight and/or in a sound volume of the speaker.

(7) Embodiments 1 and 2 describe a case where the frame rate is modified according to the program type. Embodiment 3 describes a case in which all of the setting values of the frame rate, the luminance level, and the sound level are modified. However, only one or two of the setting values may be modified.

(8) Embodiment 3 describes a case in which all the setting values of the frame rate, the luminance level, and the sound level are modified when the battery level is equal to the threshold value or smaller. However, threshold values of the battery level, for example, may be set at a plural number, and the luminance level, the frame rate, and the sound level may be modified in sequence according to the threshold values.

INDUSTRIAL APPLICABILITY

The mobile information terminal in accordance with the present invention is applicable to a mobile information terminal such as a mobile phone that is able to reproduce moving image contents.

The invention claimed is:

1. A mobile information terminal that reproduces a moving image content, comprising:
a type judgment unit operable to judge a type of the moving image content; and
a reproduction unit operable to select, according to the type judged by the type judgment unit, one reproducing mode out of a plurality of reproducing modes each associated with reproduction that results in a different level of power consumption, and to reproduce the moving image content in the selected reproducing mode, wherein
the plurality of reproducing modes include a same type of processing for which different setting values are set, and
when a previous reproducing mode changes to the selected reproducing mode, the reproduction unit sequentially changes a value for the same type of processing from a setting value of the previous reproducing mode to a setting value of the selected reproducing mode as time progresses, such that the value for the same type of processing changes from the setting value of the previous reproducing mode to at least one intermediate setting value before changing to the setting value of the selected reproducing mode.

2. The mobile information terminal of claim 1, wherein
the reproduction unit comprises a display unit operable to display the moving image content, and
the plurality of different setting values for the same type of processing are a plurality of different frame rates for displaying the moving image content on the display unit.

3. The mobile information terminal of claim 1, wherein
the reproduction unit comprises a backlight, and
the plurality of different setting values for the same type of processing are a plurality of different luminance levels of the backlight for displaying the moving image content.

4. The mobile information terminal of claim 2, wherein
the reproduction unit further comprises a sound output unit operable to output sound of the moving image content,
the plurality of different setting values for the same type of processing are a plurality of different sound levels for outputting the sound of the moving image content, and
according to the type judged by the type judgment unit, the reproduction unit selects one frame rate out of the plurality of frame rates and one sound level out of the plurality of sound levels, and reproduces the moving image content at the selected frame rate and sound level.

5. The mobile information terminal of claim 3, wherein
the reproduction unit further comprises a sound output unit operable to output sound of the moving image content,
the plurality of different setting values for the same type of processing are a plurality of different sound levels for outputting the sound of the moving image content, and
according to the type judged by the type judgment unit, the reproduction unit selects one luminance level out of the plurality of luminance levels and one sound level out of the plurality of sound levels, and reproduces the moving image content at the selected luminance level and sound level.

6. The mobile information terminal of claim 1, wherein
the moving image content is a broadcast program composed of digital broadcasting data, and
the type judgment unit judges a type of the broadcast program according to an acquired electronic program guide.

7. The mobile information terminal of claim 1, wherein
the moving image content comprises one of stereo sound data and monaural sound data,
a type of a broadcast program composed of the moving image content is determined depending on which one of the stereo sound data and the monaural sound data is comprised in the moving image content, and
the type judgment unit judges the type of the broadcast program by distinguishing the stereo sound data from the monaural sound data.

8. The mobile information terminal of claim 1, further comprising:
a battery; and
a battery power judgment unit operable to judge whether a battery level is equal to a threshold value or below, and wherein
only if the battery power judgment unit judges that the battery level is equal to the threshold value or below, the reproduction unit selects one reproducing mode out of the plurality of reproducing modes according to the type judged by the type judgment unit, and reproduces the moving image content in the selected reproducing mode.

9. A reproducing method for a reproduction device to reproduce a moving image content, comprising:
a judging step of judging a type of the moving image content; and a reproduction step of selecting, according to the type judged by the type judgment unit, one reproducing mode out of a plurality of reproducing modes each associated with reproduction that results in a different level of power consumption, and reproducing the moving image content in the selected reproducing mode, wherein the plurality of reproducing modes include a same type of processing for which different setting values are set, and in the reproducing step, when a previous reproducing mode changes to the selected reproducing mode, the reproduction unit sequentially changes a value for the same type of processing from a setting value of the previous reproducing mode to a setting value of the selected reproducing mode as time progresses, such that the value for the same type of processing changes from the setting value of the previous reproducing mode to at least one intermediate setting value before changing to the setting value of the selected reproducing mode.

10. The mobile information terminal of claim 1, further comprising:

a sound output unit operable to output sound of the moving image content, wherein the plurality of different setting values for the same type of processing are a plurality of different sound levels for outputting the sound of the moving image content.

* * * * *